United States Patent [19]

MacFarlane et al.

[11] Patent Number: 4,942,501
[45] Date of Patent: Jul. 17, 1990

[54] SOLID ELECTROLYTE CAPACITORS AND METHODS OF MAKING THE SAME

[75] Inventors: Douglas R. MacFarlane, Elsternwick; Arthur K. Philpott, Neerim South; John R. Tetaz, Templestowe, all of Australia

[73] Assignee: Specialised Conductives Pty. Limited, Neerim South, Australia

[21] Appl. No.: 187,239

[22] Filed: Apr. 28, 1988

[30] Foreign Application Priority Data

Apr. 30, 1987 [AU] Australia ............................. PI1684

[51] Int. Cl.$^5$ .............................................. H01G 9/00
[52] U.S. Cl. ........................................ 361/523; 29/25.03
[58] Field of Search ................. 361/433, 323, 322; 29/570.1; 427/79; 252/62.2; 128/419

[56] References Cited

U.S. PATENT DOCUMENTS

| | | | |
|---|---|---|---|
| 3,345,543 | 10/1967 | Sato | 361/433 S |
| 3,483,438 | 12/1969 | Sharbaugh | 29/570.1 |
| 3,555,369 | 1/1971 | Yoshino | 361/502 |
| 3,872,358 | 3/1975 | Murakami et al. | 361/433 E |
| 3,883,784 | 5/1975 | Peck et al. | 361/312 |
| 3,898,539 | 8/1975 | Yoshimura et al. | 361/527 |
| 3,955,126 | 5/1976 | Murakami et al. | 361/433 E |
| 4,009,424 | 2/1977 | Itoh | 361/433 A |
| 4,414,607 | 11/1983 | Sekido et al. | 361/502 |
| 4,533,975 | 8/1985 | Bill | 361/323 |
| 4,571,664 | 2/1986 | Hyland | 361/540 |
| 4,731,705 | 3/1988 | Velasco et al. | 361/502 |

FOREIGN PATENT DOCUMENTS

| | | |
|---|---|---|
| 0208589 | 1/1987 | European Pat. Off. . |
| 2914777 | 10/1980 | Fed. Rep. of Germany . |
| 3811415 | 10/1988 | Fed. Rep. of Germany . |
| 63-219120 | 9/1988 | Japan . |

OTHER PUBLICATIONS

Munshi and Owens, "Flat Polymer Electrolytes Promise Thin-Film Power, IEEE Spectrum", Aug., 1989.
J. R. MacCallam and C. A. Vincent, Polymer Electrolyte Reviews—1, Elsevier Applied Science Publishers Ltd. (1987), pp. 1-22.
Matsushita News, Nov. 11, 1987.
Nihon Keizai Shinbun, "New Solid Electrolyte Sheet Developed" (11/12/87).
Solid Aluminum Capacitors, 2222 121, p. 385, June, 1985.

*Primary Examiner*—Donald A. Griffin
*Attorney, Agent, or Firm*—Gottlieb, Rackman & Reisman

[57] ABSTRACT

Compact leak-proof electrolytic capacitors including, between the anode and the cathode, an ultrathin layer of a solid electrolyte, are disclosed. The solid electrolyte comprises a solid solution of (a) an alkali metal salt, a transition metal salt or an ammonium salt of (b) a monobasic, dibasic or tribasic acid other than a haloid acid (c) in a polymer of high solvation power. Preferred salts are the tetrafluoroborates and hexafluoroglutarates of sodium and potassium, and the preferred polymer is a blend of polyethylene oxide with a siloxane-alkylene oxide copolymer. Methods of making such capacitors are also disclosed. Rolled solid electrolyte capacitors of this type are characterized by low volume, absence of electrolyte leakage, and minimum dielectric deformation, and are capable of delivering intense bursts of current on demand, thereby being suitable for use in biomedical electronic devices such as cardiac pacemakers and defibrillators implanted in the human body.

73 Claims, 6 Drawing Sheets

SOLID ELECTROLYTE CAPACITORS AND METHODS OF MAKING THE SAME

TECHNICAL FIELD

This invention relates to electrolytic capacitors. More particularly it relates to electrolytic capacitors which utilize a solid electrolyte and to methods of making such capacitors. While the applicability of the principles of the present invention is fairly wide and general, for the sake of an orderly presentation, and to facilitate the comprehension of those principles, the description will focus in the first instance on the structural characteristics of and manufacturing methods for solid electrolyte capacitors which are designed to be used in implantable biomedical electronic devices such as cardiac pacemakers and defibrillators.

BACKGROUND ART

Cardiac pacemakers and defibrillators to be implanted inside the human body require associated power supplies which must be provided with a high capacitance in order to be able to deliver intense bursts of current for very short time intervals on demand. That electrolytic capacitors are well suited for performing this function in biomedical electronic devices such as pacemakers and defibrillators is well known. Given the environment within which such a device is used, however, it is essential that the volume of the device be kept to an absolute minimum. Thus, since the capacitor in such a device ordinarily occupies as much as about 30% of the total volume of the device, which is a very high proportion relative to the other electronic components in the device, considerable effort has been expended on the problem of reducing the size of the capacitor as the best way for achieving a reduction in the size of the device as a whole. Nevertheless, attempts to minimize the volume of electrolytic capacitors have met with only limited degrees of success, for a number of reasons.

Conventionally, a capacitor of this type includes an etched aluminum foil anode, an aluminum foil or film cathode, and an interposed Kraft paper or fabric gauze spacer impregnated with a solvent-based liquid electrolyte. The entire laminate is rolled up into the form of a substantially cylindrical body and encased, with the aid of suitable insulation, in an aluminum tube which is enclosed with the other electronics in a hermetically sealed case of a suitable metal (such as titanium, for example) inert to body fluids. However, Kraft paper or gauze fabric are inherently relatively thick. Thus, the presence of those materials will control the ultimate thickness of the rolled up laminate constituted by the anode, the cathode and the paper or gauze spacer, i.e., it will limit the extent to which the size of the capacitor can be reduced.

In any such electrolytic capacitor, of course, there exists the risk that the liquid electrolyte will leak out. Accordingly, the capacitor must be hermetically sealed to prevent any leakage of the liquid electrolyte therefrom, since if the liquid were to come into contact with the other electronic components encapsulated in the device, it could damage them sufficiently to cause the device to fail to operate properly. In extreme cases, the patient's life could then be in jeopardy. Hermetically sealing the liquid electrolyte into the capacitor thus has become standard practice, but this also inherently seals in any gases that may become liberated during the use of the capacitor. To accommodate such gases and prevent a potentially harmful buildup thereof, it has become necessary to provide the capacitor with an expansion or compliance chamber into which the gases can be permitted to escape and accumulate so as to avoid their having any adverse effect on the device. That, however, has entailed an increase, rather than a reduction, in the volume of the capacitor and is clearly an unacceptable expedient for use in a device for which minimization of volume is a critical consideration.

The presence of the liquid electrolyte in such a capacitor entails yet a further disadvantage. As is well known, the face of the aluminum anode is coated with a thin layer of aluminum oxide, which constitutes the dielectric for the capacitor and is formed through an electrochemical action resulting from the application of a positive voltage to the anode. The continued contact of the oxide layer with the solvent-based liquid or gel electrolyte over a period of time, however, especially while the capacitor is not in use, tends to cause the oxide layer to become degraded or "de-formed" by being dissolved in the electrolyte, as a consequence of which the shelf life of the capacitor is relatively limited. Ordinarily, of course, the application of a voltage across the capacitor during use would tend to cause the oxide layer to be re-formed, however, the presence of the liquid electrolyte reduces the lifetime of the formed oxide layer. Thus, such a capacitor, in addition to a decreased shelf life, tends to have a shortened useful service life as well.

Among the attempts to achieve a reduction of the volume of such electrolytic capacitors is one represented by U.S. Pat. No. 3,555,369, which suggests the replacement of the conventional Kraft paper spacer or insulator of the capacitor with a thin semipermeable membrane of a polymeric material. Such a membrane would be thin, i.e., less than $40\mu$ thick, and preferably its thickness would be between about $1\mu$ and $2\mu$ or even less. Viewed in the abstract, this proposal might well have enabled a substantial reduction in the volume of the capacitor to be achieved because, given the normal thickness, on the order of about $100\mu$ or so, of the aluminum foil components of the capacitor, the size of the rolled up laminate would in essence be determined by the thickness of the foils, with the contribution of the semipermeable membrane layer to the overall thickness being, for all practical purposes, negligible. However, a capacitor according to this proposal requires that the semipermeable membrane must be impregnated with a solvent-based liquid electrolyte. Thus, the electrolytic capacitor of this patent must still be sealed hermetically in order to prevent any leakage of the electrolyte from the capacitor, and that in turn necessitates the provision of an expansion or compliance chamber to accommodate any liberated gases. The provision of such a chamber, of course, negates the volume reduction achieved by the use of the thin spacer constituted by the semipermeable membrane. Further, the presence of the liquid electrolyte in the electrolytic capacitor according to this patent will subject the capacitor to the previously described deformation of the oxide dielectric layer on the anode, and at the same time the presence of the liquid electrolyte will tend to adversely affect the lifetime of the formed oxide layer of the capacitor.

Starting from another vantage point, it has been proposed in U.S. Pat. No. 3,883,784 to produce capacitors in which the spacer or insulator between the anode and the cathode does not include a liquid or gel electrolyte but rather is at least in part a solid "polymeric association product" which, as disclosed in the patent, is a class of polymeric materials characterized by a multiplicity of ionic acceptors and a multiplicity of ionic donors (or interstitial impurities which act as ionic donors). The polymeric material is preferably an association product of polyethylene oxide (providing proton acceptor hydrogen bonding sites) and a polymeric resin such as a phenolic compound (providing proton donor hydrogen bonding sites), and it is suggested in the patent that this material may behave, in many aspects, like a solid electrolyte.

U.S. Pat. No. 3,883,784 discloses that the polymeric association product either may be impregnated into a conventional Kraft paper spacer before the latter is assembled with the metallic anode and cathode, or may be formed as a layer or film interposed (without any associated layer of paper) between the anode and cathode. However, apart from the case of a capacitor with a Kraft paper spacer (which is inherently subject to the limitation on capacitor volume reduction previously referred to herein), the patent further discloses that a film or layer of the polymeric association product when used as the spacer in a capacitor is on the order of about 0.0045 inch to about 0.0085 inch thick (approximately $114\mu$ to $216\mu$). Thus, the polymeric association product spacers which are described in this patent are far thicker than conventional Kraft paper spacers, and consequently will not only fail to achieve a volume reduction for the capacitor but actually will tend to make the same larger than one utilizing a Kraft paper spacer.

Moreover, notwithstanding the suggestion that some of the various types of capacitors described in U.S. Pat. No. 3,883,784 may act like electrolytic capacitors in certain cases, they are clearly not electrolytic capacitors as that term is understood in the art and do not have the properties of those types of electrolytic capacitors which are suited for use in biomedical electronic devices such as pacemakers and defibrillators. This conclusion is implicit in the fact that the capacitors described in the patent and utilizing a spacer film made of the stated polymeric association product material may be bidirectional rather than polar devices. Thus, such a spacer film will then not be capable of supporting normal electrolytic action at any overvoltage, and placing a high negative voltage on the anodized aluminum electrode will reduce the oxide layer, producing aluminum and, in the presence of the hydrogen ions, hydroxyl ions, all without the capacitor having any substantial oxide layer re-forming capability. Also, the capacitance values characterizing the capacitors described in the patent are much smaller than those of normal electrolytic capacitors of comparable size. Finally, the DC conductivity of the polymeric association product material used in forming the spacer films of those capacitors is extremely low for any material ostensibly functioning as an electrolyte.

DISCLOSURE OF INVENTION

It is an object of the present invention, therefore, to provide novel and improved electrolytic capacitors which, by virtue of their structural features, avoid the hereinbefore mentioned as well as other drawbacks and disadvantages of heretofore known electrolytic and quasi-electrolytic capacitors designed for the same purposes.

It is a more specific object of the present invention to provide novel and improved electrolytic capacitors of the aforesaid type the structure of which is characterized by the presence, between the anode and the cathode thereof, of a layer of solid electrolyte constituted of a solid solution of certain metal salts in a polymer matrix, whereby such capacitors are characterized by being immune to any leakage of electrolyte, by having a volume appreciably smaller than that of the heretofore smallest available electrolytic capacitors of comparable constructional and operational properties, and by having improved electrolytic stability and oxide layer re-forming properties leading to a longer shelf life as well as a longer useful service life and a relatively higher working voltage.

It is also an object of the present invention to provide methods for making such solid electrolyte capacitors.

Generally speaking, the objectives of the present invention are attained by a compact electrolytic capacitor which includes, between the electrically conductive anode and cathode thereof, an ultrathin layer constituted of a solid electrolyte comprising a solid solution of (a) at least one salt selected from the group consisting of alkali metal salts, transition metal salts and ammonium salts of (b) at least one acid selected from the group consisting of monobasic, dibasic and tribasic acids other than hydrohalic (haloid) acids (c) in a polymer of high solvation power. As used herein, the term "ultrathin" designates a spacer the thickness of which is in the range of about $1\mu$ to about $50\mu$ and preferably is in the range of about $5\mu$ to about $20\mu$.

More particularly, the solid electrolyte according to the present invention is made from a polymer with polar groups capable of imparting to the polymer a high solvation power for the dissolving of ions. To this end, the present invention contemplates production of the electrolyte from a high solvation power polymer such as a homopolymer, or a block, graft or other copolymer, or a blend, or a crosslinked polymer of: siloxanealkylene oxide copolymers (block, graft and comb); poly(ethylene oxide), poly(propylene oxide), and other poly(alkylene oxide)s; poly(poly(ethylene oxide)methacrylate) and other polymers formed from poly(alkylene oxide) esters of methacrylic acid, acrylic acid and alkacrylic acids generally; poly(alkylene oxide)poly-(urethane urea) copolymers; comb polymers having a polyphosphazene backbone and poly(alkylene oxide) sidechains; polymers of the poly(alkylene oxide) esters of itaconic acid; polyepichlorohydrin; poly(ethylene succinate), poly(Beta-propiolactone), poly(ethylene adipate), and other polyesters; poly(ethylene imine); poly(N-propylaziridine); or any of the above in which the poly(alkylene oxide) is replaced by poly(alkylene sulfide). Plasticization of the polymer to facilitate its formation into a film or foil is achieved by blending the polymer with up to 60 wt % of a lower molecular weight compound such as poly(ethylene glycol), poly(propylene glycol), and other poly(alkylene glycol)s; any of such materials which have been endcapped with alkoxy, carboxylic acid or other functional groups; propylene carbonate; or glycerol, ethylene glycol and other polyols which optionally may be end capped with alkoxy, acid or other functional groups. Presently preferred is a blend of poly(ethylene oxide) and a poly(methylmethoxy[poly(ethylene glycol)] siloxane) copolymer.

Dissolved in the polymer and constituting the electrolytic or ion-producing component of the solid electrolyte, is a salt of an alkali metal such as lithium, sodium or potassium, or a transition metal such as silver or mercury, or ammonium, of an acid other than a haloid or hydrohalic acid, and in particular of a monobasic acid such as cyanic acid, or a dibasic acid such as carbonic or chromic acid, or a tribasic acid such as boric or phosphoric acid, or a carboxylic acid such as acetic acid, or a dicarboxylic acid such as glutaric, oxalic, phthalic or tartaric acid, or a tricarboxylic acid such as citric acid. Presently preferred salts for use in the case of a capacitor having an aluminum anode are the hexafluoroglutarates and the tetrafluoroborates of lithium, sodium and potassium, and of these the preferred salt is potassium hexafluoroglutarate. The molar concentration of the salt in the polymer electrolyte preferably is between 0.005 and 1 times that of the oxygen or sulfur atoms therein.

The anode preferably is in the form of a foil of any of a class of metals such as aluminum, tantalum, niobium, tungsten or other anodic metals which are commonly used in the construction of electrolytic capacitors, aluminum foil annealed and deeply etched to maximize its surface area being particularly suitable for the type of capacitor intended for use in cardiac pacemakers and defibrillators. The layer constituted of the solid electrolyte in such a capacitor is preferably constructed by progressively impregnating and coating the anode foil with increasingly viscous films of a solution of the polymer in a suitable solvent such as acetonitrile. This process ensures complete coverage of the finely etched anode foil (including complete penetration and filling of the etched in pores or depressions) and provides appropriate stress relief to prevent powdering at the anode metal/oxide interface or fracture of the foil. The surface of the solid electrolyte polymer may additionally be cross-linked by chemical or radiative means. This strengthens the polymer film (or the polymer foil, if a foil is used), allowing it to be rolled with the anode and cathode.

The cathode, which in the basic embodiments of the present invention is made of any suitable metal such as platinum, silver, gold, nickel, aluminum, or the like, can be constructed in the form of a foil of such a metal and then laminated with the anode and the solid electrolyte layer. Alternatively, it can be formed in situ as a film by painting, sputtering, evaporating, or otherwise depositing the metal directly onto that surface of the solid electrolyte layer which is directed away from the polymer/oxide layer interface. It is also contemplated by the present invention that the cathode can be constituted of a mass of electrically conductive carbon or other conducting particles in the range of about $0.5\mu$ to $5.0\mu$ in size deposited in layer formation on the surface of the solid electrolyte layer by means of a suitable polymer ink, or that it can be constituted of a mass of such particles incorporated in layer formation and at a loading of at least 50% in the immediate subsurface region of the solid electrolyte layer. In the first of these variants, either no such particles are found within the solid electrolyte layer, or there may also be a quantity of such particles incorporated in the immediate subsurface region of the solid electrolyte layer but at a loading of less than 50% so that those particles do not constitute a part of the cathode but serve to reduce the internal impedance of the capacitor. In the second variant, of course, a suitable cathode lead will be provided in electrical contact with the embedded mass of particles.

The dielectric, i.e., the oxide of the anode metal, can be formed before or after application of the solid electrolyte to the anode. The method of forming the oxide layer after application of the solid electrolyte entails exposing the electrolyte polymer, before it is hardened, to a controlled humid atmosphere so as to cause a limited amount of moisture to be absorbed by the polymer, and then applying an appropriate electric field between the anode and the cathode. The polymer will then comprise a small amount of a hydroxyl group-containing substance; which may be water. Alternatively alcohol may be used. Preferably, the humidity control is effected by means of a suitable desiccant, e.g., silica gel or phosphorus pentoxide, incorporated in the housing of the capacitor. The presence of the desiccant additionally helps to minimize the subsequent oxide layer de-formation rate while concurrently helping to minimize any decrease in the oxide layer re-forming capability of the capacitor.

As previously intimated herein, it is also an object of the present invention to provide novel and improved solid electrolyte capacitors which are adapted for use in applications other than pacemakers and defibrillators, and also to provide methods of making such capacitors.

Merely by way of example, it is contemplated in accordance with one modified embodiment of the present invention to provide such a capacitor which includes an anode that is not made of an etched foil of the anodic metal but rather is made of a mass of particles of the metal embedded, in a suitable layer configuration, in a matrix of solid polymer electrolyte. In this construction, the metal particles may be in the form of flakes, powder or microspheres and are in electrical contact with one another throughout the layer-forming mass, with each particle being coated by a thin dielectric oxide layer. The overall thickness of the polymer matrix is somewhat greater than that portion thereof which accommodates the anode-forming mass of particles, thereby to provide an excess quantity of the solid electrolyte which is free of the metal particles and which is to constitute the ultrathin layer of electrolyte between the anode and the cathode. The ultrathin electrolyte layer portion of the polymer matrix may be formed either jointly with or after completion of the impregnation of the mass of metal particles in the polymer.

To facilitate the application of potential to the anode, an anode connector lead in the form of a foil, wire or other suitable electrical conductor is electrically connected to the mass of anode-forming particles, for example, by having a portion of the particulate mass protrude from the electrolyte polymer matrix so as to be able to be connected directly to the lead, or by having a thin layer of an insulating polymer over the electrolyte polymer matrix at the location of the particulate anode and filled with a sufficient quantity of the anodic metal particles to provide an electronic connection between the anode connector lead and the anode without providing an ionic connection therebetween. Such a capacitor is particularly suitable for use in applications where a stacked configuration, including a plurality of individual capacitance units each including an anode, a cathode and an interposed solid electrolyte layer, is desired.

It is further contemplated that in accordance with yet another embodiment of the present invention the principles thereof may be embodied in a capacitor, known as a double layer capacitor, which does not include an anode made of anodic metal and hence does not include an oxide dielectric layer. Such a capacitor utilizes a porous mass of electrically conductive carbon particles embedded in a layer formation in a solid polymer electrolyte matrix to constitute the anode of the capacitor. The particles may be loose or sintered into the form of a porous body. An anodic connector foil is electrically connected to the layer of carbon particles, and an ultrathin layer of solid polymer electrolyte devoid of carbon particles is interposed between the latter and the cathode. The degree of impregnation of the mass of carbon particles by the solid polymer electrolyte is such that each comprises about 50% by volume of the total anodic body. A capacitor of this type, since it does not use anodic metal and hence does not include a dielectric layer, is not suited for use in a high frequency or high voltage environment but is capable of providing a high capacitance and low voltage capability which makes it suitable for use in a variety of applications, e.g., a miniaturized computer memory backup.

The solid electrolyte capacitors according to the present invention provide a number of advantages. Among these are 1. Better linearity of capacitance with applied voltage. Generally, conventional aluminum electrolytic capacitors have an energy storage value or capacitance which increases with applied voltage. This is probably due to penetration of the liquid electrolyte into the aluminum oxide surface coating on the anode. Sometimes, however, such penetration is undesirable, as it can result in a change in the dielectric characteristics and hence in a distortion of the waveform in pulse applications. Because the capacitor of the present invention does not use a liquid solvent in the electrolyte, any tendency toward variation of capacitance with applied voltage is greatly reduced.

2. Higher breakdown voltage. All other things being equal, the solid electrolyte capacitor of the present invention is characterized by a higher breakdown voltage than is normally found in conventional electrolytic capacitors. For example, if a capacitor made with a high purity etched aluminum foil and a conventional liquid electrolyte has a dielectric breakdown voltage of 350 volts DC, an identically constructed capacitor utilizing a solid electrolyte according to the present invention would provide an increase in the breakdown voltage to 390 volts, and even voltages in excess of 400 volts are achievable at acceptable leakage currents Furthermore, if a 100$\mu$ thick layer of solid electrolyte is used, the breakdown voltage for the dielectric can be increased from the nominal rating of 350 volts to better than 500 volts.

3. Higher capacitance per unit area. In the capacitor of the present invention, the dielectric oxide layer cannot be hydrated or otherwise penetrated by the electrolyte; thus, a more compact oxide layer results. This produces a higher capacitance per unit area of etched anode foil than is obtained with liquid electrolytes at a given voltage. For example, a segment of foil having a discharge capacitance of 0.74$\mu$ F per $cm^2$ in a liquid electrolyte is found to have a discharge capacitance of 0.87$\mu$ F per $cm^2$ in the solid polymer electrolyte of the present invention. Solid polymer electrolyte capacitors according to the present invention are further found on discharge to deliver about 30% more charge than would normally be expected on the basis of the anode foil surface area in a liquid electrolyte capacitor.

4. Lower electrical leakage and improved shelf factor In a conventional capacitor provided with a liquid or gel electrolyte, electrical leakage increases with age because of parasitic electrochemical reactions which break down the insulating oxide layer coating the anode. The solid electrolyte capacitors of the present invention have a much lower electrical leakage at any given voltage and are much less susceptible to dielectric layer breakdown because of the absence of a liquid electrolyte. Consequently, the increase of electrical leakage with age of such capacitors is substantially reduced and their shelf life is materially enhanced.

5. Reduced capacitor size. Leakage of the liquid or gel electrolyte from a conventional electrolytic capacitor is a significant problem in high reliability applications. For such an application it is necessary, therefore, to hermetically seal the capacitor housing to prevent the electrolyte from leaking out, and the housing also requires an additional free volume serving as a compliance or expansion chamber for evolved hydrogen. In a capacitor according to the present invention, the electrolyte, being solid, does not leak or diffuse out of the capacitor, and the capacitor housing thus does not need to be hermetically sealed. The size of the capacitor is, consequently, greatly reduced vis-a-vis that of a conventional liquid electrolyte capacitor, which is a substantial advantage where the capacitor is intended for use in a cramped environment, e.g., in an implantable biomedical electronic device such as a pacemaker or defibrillator, or in a miniaturized computer memory device, or the like.

6. High discharge current density and low dissipation factor. The present invention enables very high current discharges and low dissipation factors to be achieved in a completely solid electrolyte because of the presence therein of a highly polar polymer such as the siloxane-alkylene oxide copolymers which allow the solvation of alkali metal salts (such as, for example, potassium hexafluoroglutarate, sodium tetrafluoroborate, lithium thiocyanate, and the like).

7. Improved utilization of anode foil strength. The solution of the solid electrolyte of this invention in acetonitrile has a low viscosity before curing and can penetrate pores less than 0.025$\mu$ wide. Thus, the highly etched foil used in aluminum electrolytic capacitors, which is normally quite fragile and brittle, can be totally penetrated with a coating of polymer on all pore surfaces. This takes full advantage of the foil's high surface area, strengthens it, and reduces the tendency for the foil and its oxide coating to powder. Local stress relief can be provided by applying the polymer electrolyte to the foil in a succession of passes, with the polymer in the successive layers being of progressively increased molecular weight.

BRIEF DESCRIPTION OF DRAWINGS

The foregoing and other objects, characteristics and advantages of the present invention will be more clearly understood from the following detailed description thereof when read in conjunction with the accompanying drawings, in which.

MODES FOR CARRYING OUT THE INVENTION

Figure 1:
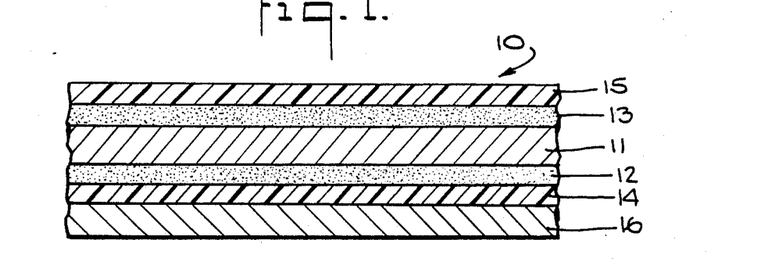
FIG. 1 is a diagrammatic fragmentary cross-sectional view of the basic laminate structure of the components of a solid electrolyte capacitor according to one embodiment of the present invention.

Referring now to the drawings in greater detail, there is shown in FIG. 1 in greatly exaggerated form the basic laminate or sandwich layer structure 10 which constitutes the capacitance element of a solid electrolyte capacitor embodying the fundamental principles of the present invention. The laminate includes a highly etched foil 11 (the etching is not shown in this view) of a suitable anodic metal, preferably aluminum, to constitute the anode of the capacitor, the foil 11 having on both its opposite faces respective thin layers 12 and 13 of aluminum oxide (or the oxide of whatever other metal the foil 11 happens to be made of) to constitute the dielectric of the capacitor. Overlying the dielectric layers 12 and 13 and filling the etched in pores of the anodic foil 11 are respective ultrathin layers 14 and 15 of the solid electrolyte according to the present invention. Overlying the solid electrolyte layer 14 is a further foil or film 16, of a metal such as aluminum, silver, gold, platinum, nickel, or the like, to constitute the cathode of the capacitor.

In the preferred embodiment of the present invention, the solid electrolyte is in the form of an ultrathin layer not more than about 50$\mu$ thick, and preferable not more than about 20$\mu$ thick. The electrolyte is composed of a solid solution of a metal salt in a polymer of high solvation power, preferably a solid solution of an alkali metal salt of a dicarboxylic acid, e.g., potassium hexafluoroglutarate, in a blend of a siloxane-alkylene glycol copolymer with poly(ethylene oxide). The solid electrolyte layers 14 and 15 could in theory be separately prepared as foils and then bodily laminated to the dielectric-coated anodic foil 11. In practice, however, it is found that the handling of an ultrathin layer of polymer electrolyte in the form of a foil poses substantial difficulties. It is preferred, therefore, to form the layers 14 and 15 as films by depositing the polymer electrolyte in the form of a solution thereof in acetonitrile directly onto the surfaces of the anode foil and then curing the films. Within this concept it is further preferred to apply the fluid polymer electrolyte to each anode surface in several passes, with the polymer in each pass after the first having a somewhat higher molecular weight than the polymer in the last preceding pass. Thus, the film of lowest molecular weight would be applied first and thereafter the additional films of progressively higher molecular weight. This manner of progressively building up the final solid electrolyte layer ensures the complete coverage of the entire surface of even the most finely etched anode foil, since the solution of the polymer electrolyte is able to penetrate even into pores less than 0.025$\mu$ wide, and provides appropriate stress relief to prevent powdering at the anode metal/oxide interface or fracturing of the anodic foil.

In essence, the application of the polymer electrolyte film is preferably effected in either of two ways. One of these entails utilizing for the various passes respective polymers which have different molecular weights prior to their polymerization; for example, a coating of an electrolyte-containing solution of polymerizable material of low molecular weight is applied to the bare oxidized surface of the anode foil in an amount sufficient to at least fill all the pores thereof, and the material is then polymerized, after which a second coating of an electrolyte-containing solution of polymerizable material of high molecular weight is applied to the hardened first coat, in an amount sufficient to bring the overall electrolyte layer thickness relative to the foil surface to the desired value, and followed by the polymerization of the second material. The other way entails utilizing for the various passes an electrolyte-containing solution of polymerizable material the respective quantities of which have been prepolymerized to different degrees and thus have correspondingly different molecular weights, with the less polymerized material being applied first.

Other methods of obtaining the same result may, of course, also be used. Merely by way of example, the anode foil may be coated with an electrolyte-containing solution of polymerizable material applied to the desired thickness in a single pass, which material is then provided with a degree of surface polymerization (e.g., by means of surface irradiation with ultraviolet light) which is greater than its bulk polymerization.

It will be understood that the choice of any particular one of these methods will in general depend on the ultimate design characteristics of the capacitor desired. Thus, the use of any particular degree of variation of the molecular weight of the polymer throughout the thickness of the solid electrolyte layer will enable the manufacturer to control the internal resistance of the capacitor relative to the strength of the electrolyte layer.

It will further be understood that a degree of control over the ultimate characteristics of the capacitor may also be achieved by an appropriate selection of the polymer components of the solid electrolyte. Thus, using only poly(ethylene oxide) by itself as the polymer component of the solid electrolyte would provide a layer having higher mechanical stability at high temperatures (90° C.), but such a layer would also have a high internal electrical resistance. On the other hand, utilizing only a siloxane copolymer as the polymer component of the solid electrolyte would provide a layer having a low internal electrical resistance, but such a layer would also have a relatively low strength at high temperatures (above 60° C.). A blend of these polymers would, of course, yield a layer in which these properties are modified correspondingly, and the particular composition chosen in any given case will have to be determined in light of the intended application for and use environment of the capacitor. Merely by way of example, however, it is believed that a 60%/40% blend of poly(ethylene oxide) and siloxane-alkylene glycol copolymer will provide optimal characteristics for most applications.

The cathode layer 16 may also be provided in the form of a separate foil suitable for lamination to the solid electrolyte layer 14. Alternatively, however, especially if the cathode thickness is to be minimized, the cathode layer may be formed in situ as a film by painting, sputtering, evaporating or otherwise depositing the metal onto the surface of the solid electrolyte layer. Merely by way of example, the cathode may be formed by applying to the hardened solid electrolyte layer a film of a polymer ink containing fine particles of a conductive metal such as silver or nickel in suspension, or the film of silver or other cathodic metal may be formed by sputtering, chemical deposition or vapor deposition of the metal onto the solid electrolyte surface. A further variant of the formation of the cathode will be more fully described hereinafter with reference to FIGS. 11, 11A and 11B.

Figure 1A:
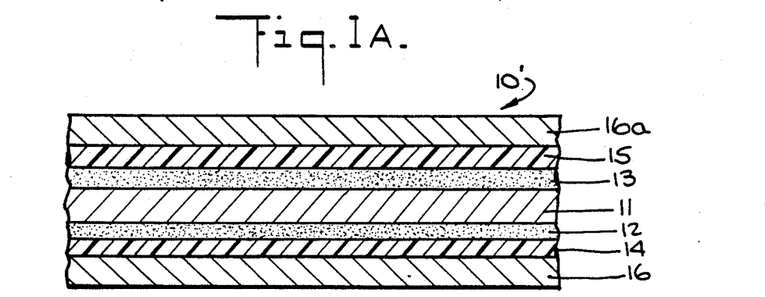
FIG. 1A is a diagrammatic fragmentary cross-sectional view, similar to FIG. 1, of the laminate structure of the components of a solid electrolyte capacitor according to a slightly modified embodiment of the present invention.

The laminate 10' shown in FIG. 1A is essentially the same as that shown in FIG. 1 except for the additional provision of a second cathode layer 16a substantially identical to the cathode layer 16. The layer 16a is advantageously adapted to be connected electrically in parallel to layer 16 to decrease the internal resistance and also provide a small increase in capacitance. Further description of the structure shown in FIG. 1A, in which elements corresponding to those of FIG. 1 are identified by the same reference numerals, is not necessary.

Figure 1B:
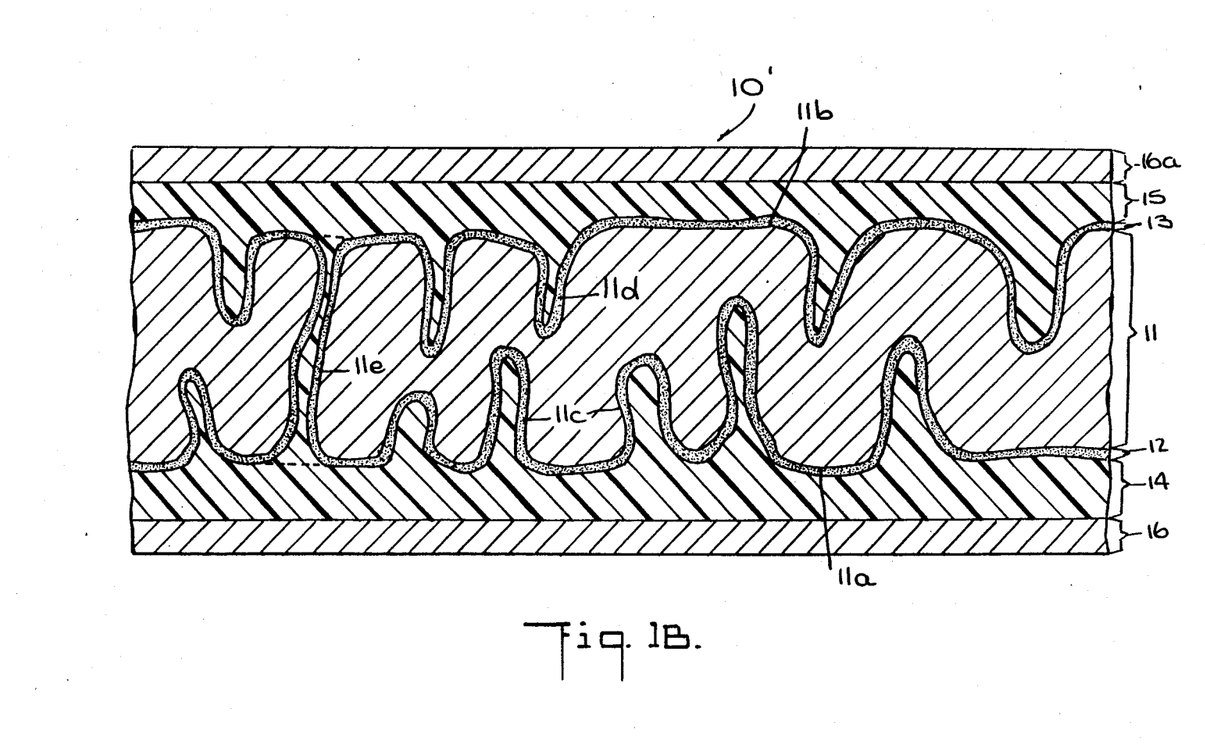
FIG. 1B is a view similar to FIG. 1A but is drawn to a greatly enlarged scale to provide a schematic illustration of the etching of the anode foil in a capacitor structure according to FIGS. 1 and 1A.

FIG. 1B schematically illustrates the surface detail of the anode foil 11. Such foils are commercially available products and as such do not constitute a part of the present invention. Accordingly, neither their actual structures (both micro and macro) nor the methods of production thereof are described herein. It is deemed sufficient to point out that the foil is annealed, and the opposite surfaces 11a and 11b of the foil 11 are deeply and finely etched to provide a multiplicity of microscopic pores or depressions 11c and 11d in the respective surfaces. As indicated in FIG. 1B, some of these pores are deeper and/or wider than other pores and, as represented at 11e, it is actually preferred that at least some of the pores extend through the entire thickness of the foil. FIG. 1B also shows that the dielectric oxide layers 12 and 13 coat the respective surfaces of the foil 11 each throughout its entire expanse, including over the entire depths of the various pores. It should be understood, of course, that the illustration of the laminate in FIG. 1B is not intended to indicate precisely the forms and configurations of the etching in the anode foil 11.

As previously mentioned, the provision of the pores or depressions 11c, 11d and 11e not only maximizes the available surface area of the foil but also enables the solid polymer electrolyte, when the same is being applied in solution to the opposite surfaces of the foil to form the electrolyte layers 14 and 15, to penetrate into the pores. As a result, a degree of mechanical interlocking of the electrolyte layers with the anode foil 11 is provided as well as a degree of stress relief through which a deterioration of the oxide coatings 12 and 13 at the interfaces thereof with the metal surfaces 11a and 11b of the foil and a possible fracturing of the latter are inhibited.

Figure 2:
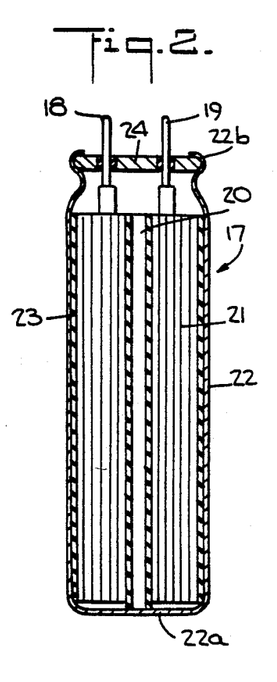
FIG. 2 is a schematic illustration of a solid electrolyte capacitor the capacitance element of which is constituted by the laminate of FIG. 1 or FIG. 2 rolled up into the form of a cylindrical body.

Referring now to FIG. 2, the electrolytic capacitor 17 there shown, the design of which is such as to render the capacitor suited for use in a pacemaker or defibrillator, utilizes as its capacitive element a laminate such as that designated 10 in FIG. 1 or preferably that designated 10' in FIG. 1A. To this end, the laminate, with suitable leads 18 and 19 appropriately secured to the anode and cathode foils or films 11 and 16/16a, respectively, is wound onto a thin, e.g., 3 mm diameter, cardboard core tube 20 into the form of a compact, substantially cylindrical body 21. The entire assembly is inserted into a cylindrical housing 22 of aluminum, titanium, or like inert stable metal, with the exterior surface of the cylindrical body 21 being insulated from the housing by an interposed insulating spacer 23. Housing 22, which is closed at its bottom end 22a, is sealed at its top end 22b in any appropriate manner, such as, for example, by means of an end plate 24 which is secured in place by crimping or rolling of the metal housing or by being brazed thereto. Suitable openings (not shown) are provided in the plate 24 through which the leads 18 and 19 pass with an insulative hermetic seal. For purposes of moisture control, i.e., to minimize the likelihood of electrolytic attack on the oxide dielectric layers in the event of the presence of some residual quantities of moisture in the housing and particularly in the electrolyte layers, it is preferred to enclose a quantity of a suitable desiccant (not shown), such as silica gel, phosphorous pentoxide, or the like, in the core tube 20.

Figure 3:
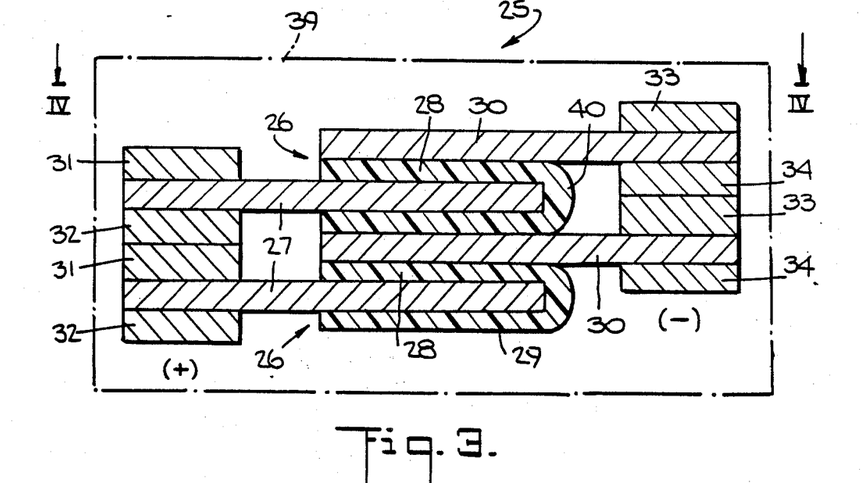
FIG. 3 is a diagrammatic fragmentary section through a stack-type solid electrolyte capacitor according to a modified embodiment of the present invention, the view being taken along the line III—III in FIG. 4.
Figure 4:
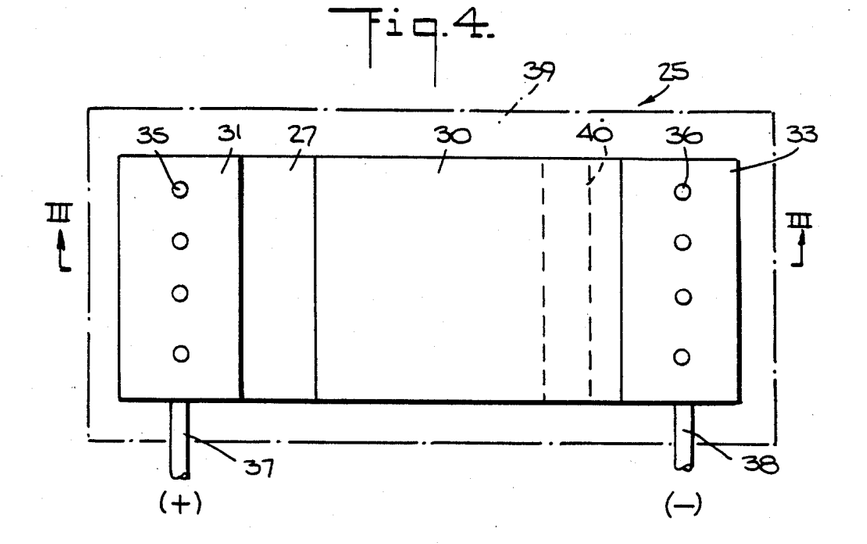
FIG. 4 is a plan view of the structure shown in FIG. 3, the view being taken along the line IV—IV in FIG. 3.

Referring to FIGS. 3 and 4, the capacitor 25 there illustrated includes a plurality of capacitive units 26 in a stacked arrangement (two are shown but there could be more). Each unit 26 includes an anode foil 27 deeply etched to provide maximum surface areas and coated on both its faces with respective ultrathin solid electrolyte layers 28 and 29, and a respective cathode foil or film 30 overlying the face of the associated electrolyte layer 28 directed away from the associated anode 27. As in the previously described embodiments of the present invention, the cathodes may be in the form of foils or films. In effect, therefore, the anodes and cathodes are interleaved, with the edges of the anodes not being adjacent the edges of the cathodes to reduce the field strength at the edges of the anodes and minimize the chance of an electrical breakdown. Suitable means are provided for connecting the anodes 27 and cathodes 30 to respective sources of positive and negative potential; in the illustrated embodiment, these means are in the form of pairs of metallic ribbons 31–32 and 33–34 which are secured to their respective electrode elements, for example, by being spot-welded or riveted thereto as schematically indicated at 35 and 36. Each of the two stacks of ribbons, which at the same time serves to maintain the desired spacings between the corresponding capacitor electrodes, is provided with a suitable lead 37 or 38 which extends out of the housing 39 of the capacitor for connection to an associated power source (not shown). To further minimize the creation of excessive electric field concentrations, the solid electrolyte layers 28 and 29 of each unit are extended around the edges of the associated intermediate anode foil 27 and, as shown at 40, the amount of the polymer electrolyte juxtaposed to the edge of each anode foil is somewhat increased in thickness to approximately twice the thickness of the layers 28 and 29 by, for example, dipping of the coated anode into uncured electrolyte.

Figure 5:
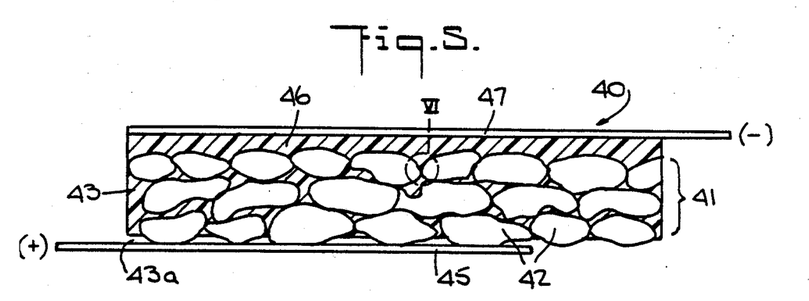
FIG. 5 is a diagrammatic fragmentary section through a solid electrolyte capacitor utilizing an anode constituted of a layer of solid electrolyte polymer-impregnated metallic particles according to a further modified embodiment of the present invention.
Figure 6:
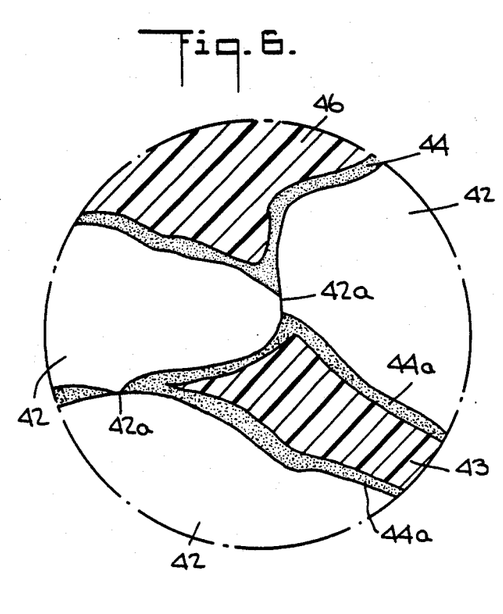
FIG. 6 is an enlarged detail view of the structure enclosed within the circle VI in FIG. 5.

In accordance with the embodiment of the invention illustrated in FIGS. 5 and 6, the capacitor laminate structure 40 there shown includes an anode 41 which is constituted, in the preferred form of this embodiment, of a mass of deeply etched aluminum flakes 42 disposed in a layer formation and embedded in a matrix of polymeric material 43. The layer of flakes is covered over its entire expanse with an aluminum oxide dielectric layer, not shown in FIG. 5 but designated 44 in FIG. 6 where it is also indicated at 42a that at areas of contact between adjacent ones of the flakes the latter are not oxide coated to establish a continuous electrical contact between the flakes throughout the mass. The loading of the flakes 42 in the polymer 43 at a density of approximately 50% by volume is sufficient to ensure that flake to flake contact exists and that at least a portion of the mass of flakes is exposed at one surface of the polymer matrix 43, as indicated at 43a in FIG. 5, to enable an anode connector lead 45 to be electrically connected to the anode. When a metal oxide forming lead 45 is used, no gap 43a is required. Superimposed over the anode-constituting mass of flakes 42 is an ultrathin layer 46 of solid electrolyte according to the present invention, to the free surface of which is secured the usual cathode foil or film 47 as previously described.

Polymer matrix 43 may be constituted of the same polymer electrolyte as the layer 46. Both the polymer matrix for the mass of particles and the solid electrolyte layer may be formed in one operation, with the quantity of polymer electrolyte used being in excess of that needed to impregnate the mass of flakes by an amount sufficient to form the desired thickness of the electrolyte layer. If the polymer matrix 43 and the layer 46 are formed separately, the latter may be built up in several passes of electrolyte-containing solution of polymerizable material having different molecular weights as previously described. Although the anode layer 41 has been described as constituted of a mass of aluminum flakes, it may be composed of a mass of other types of particles, e.g., powder granules, microspheres, and the like, and these may be made of anodic metals other than aluminum.

Figure 7:
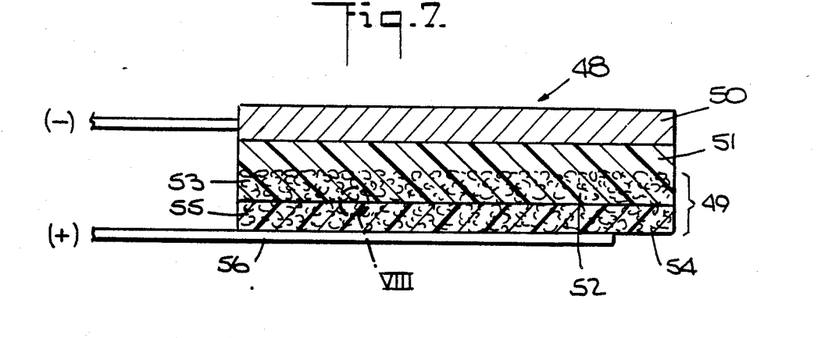
FIG. 7 is a diagrammatic fragmentary section through a solid electrolyte double layer capacitor utilizing an anode constituted of a porous layer of electrolyte polymer-impregnated sintered carbon particles according to yet another modified embodiment of the present invention.
Figure 8:
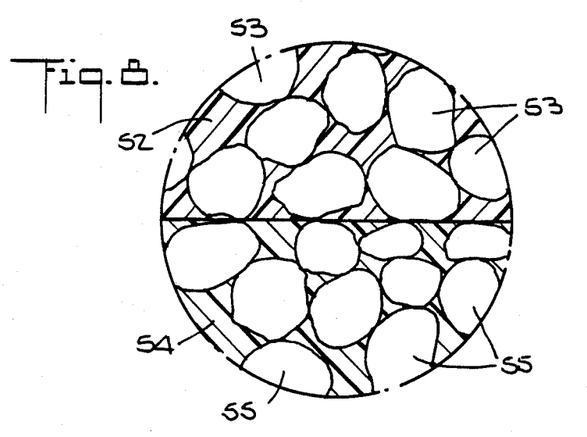
FIG. 8 is an enlarged detail view of the structure enclosed within the circle VIII in FIG. 7.

In accordance with yet another embodiment of the present invention, there is shown in FIGS. 7 and 8 a solid electrolyte capacitor laminate structure 48 having an anode 49, a cathode film or foil 50 and an intermediate solid electrolyte layer 51. The anode of the capacitor in this embodiment of the invention is constituted of a mass of mutually contacting electrically conductive carbon particles embedded in a 2-layer polymer matrix, the layer 52 containing the anodic carbon particles 53 being composed of the solid electrolyte according to the present invention and the layer 54 containing the carbon particles 55 being composed of a nonelectrolytic polymer insulating compound. Positive potential is applied to the anode particles 53 via a connector lead 56, e.g., a foil or wire, which is electrically connected to at least some of the carbon particles 55 exposed at the free surface of the layer 54. The nonelectrolytic polymer layer 54 ensures that the anode connector 56 is not in direct electrical contact with the solid electrolyte. Preferably the carbon particles in the anode layer 49 occupy about 50% by volume of the total layer. No carbon particles are present in the ultrathin layer 51 of solid electrolyte between the cathode and the anode.

Anodic layer 52 may be formed independently of the solid electrolyte layer 51, with the latter being formed in one or more passes as previously described. Alternatively, however, it is possible to form both the particle-filled layer 52 and the particle-free solid electrolyte layer 51 in one operation, with the quantity of the polymer electrolyte material used being in excess of the amount required to impregnate the mass of carbon particles 53 by the amount required to form the layer 51.

Figure 9:
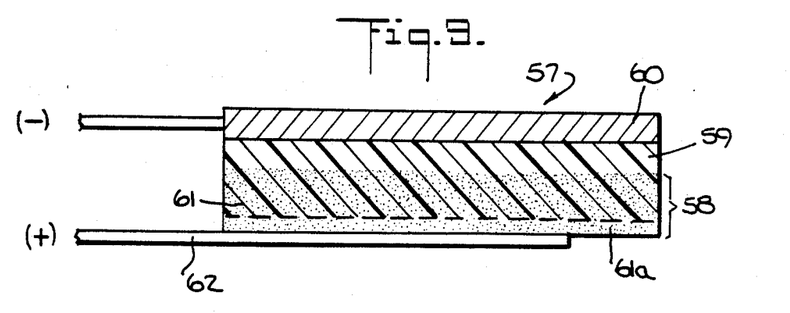
FIG. 9 is a diagrammatic fragmentary section through a solid electrolyte double layer capacitor similar to that shown in FIG. 7 but illustrating a somewhat different manner of forming the anode.

Referring to FIG. 9, the capacitor laminate structure 57 there shown includes an anode layer 58, an ultrathin solid electrolyte layer 59 according to the present invention, and a cathode foil or film 60. The anode of the capacitor in this embodiment of the invention is constituted of a 50% by volume porous body 61 of sintered carbon particles. A certain portion of the sintered carbon body is impregnated with the solid electrolyte according to the present invention, the impregnation being controlled, however, to ensure that a thin region 61a of the sintered carbon body, to the free face of which the anode connector lead, i.e., the foil or wire 62, is connected, remains free of the solid electrolyte. The impregnation of the sintered carbon body 61 is accompanied by application of the ultrathin solid electrolyte layer 59 to the opposite face of the anode 58, with the layer 59 being formed either by an excess of the material impregnated into the carbon body or by a quantity of the polymer electrolyte applied separately in one or more passes in the manner previously described herein.

Figure 10:
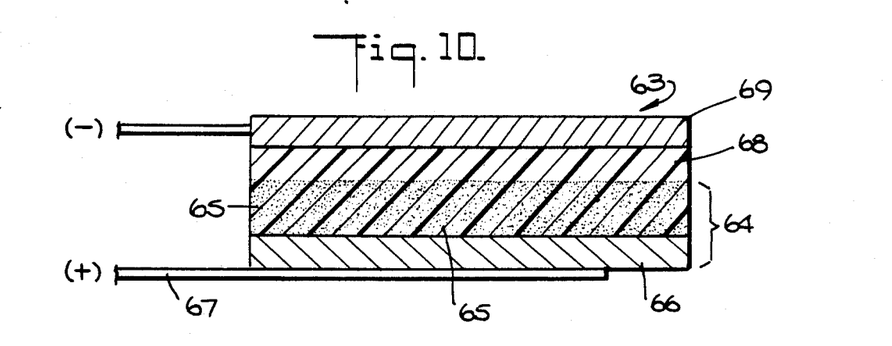
FIG. 10 is a diagrammatic fragmentary section through a solid electrolyte double layer capacitor similar to that shown in FIG. 9 but illustrating yet another manner of forming the anode.

In accordance with yet another embodiment of the present invention, the capacitor laminate structure 63 shown in FIG. 10 differs from that of FIG. 9 in that it includes an anode layer 64 a part of which is composed of a porous body 65 of sintered carbon particles impregnated with solid electrolyte according to the present invention and another part of which is composed of a body 66 of non-porous carbon interposed between the porous body and the anode connector lead 67. The other components of the laminate, i.e., the solid electrolyte layer 68 and the cathode foil or film 69, as well as the manner of impregnation of the porous carbon body 65 and the manner of formation of the layer 68, are the same as before.

As noted above, the double layer capacitors of FIGS. 7–10 are generally of very high capacitance per unit volume, but have low voltage ratings, and are thus particularly suitable for use as computer memory backup.

Figure 11:
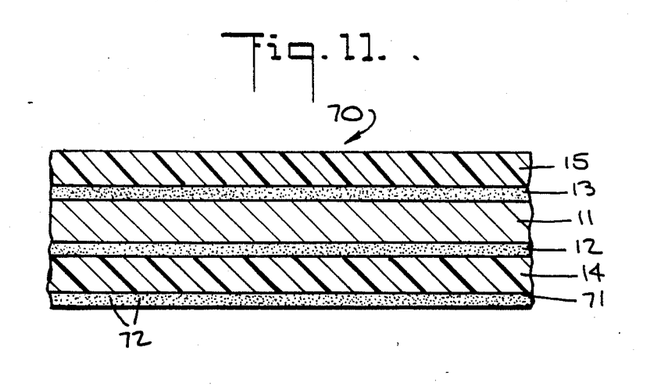
FIGS. 11, 11A and 11B are diagrammatic fragmentary cross-sectional views of the basic solid electrolyte capacitor laminate structure utilizing a novel cathode construction according to still another embodiment of the present invention.

As previously mentioned, the present invention also contemplates the formation of the cathode of the capacitor in a novel way by utilizing a mass of electrically conductive carbon particles. One variant of this aspect of the invention is illustrated schematically in FIG. 11, which shows a laminate 70 basically similar to the laminate 10 shown in FIG. 1 and including an anode 11, a pair of oxide dielectric layers 12 and 13 thereon, a pair of solid electrolyte layers 14 and 15 over the oxide layers, and a cathode. The latter, which is designated 71 in FIG. 11, is, however, constituted of a layer of electrically conductive carbon particles 72 in electrical contact with each other. The cathode 71 preferably is formed by depositing (e.g., by painting) onto that surface of the solid electrolyte layer 14 which is directed away from the anode a coat of a suitable liquid carrier having the particles 72 dispersed therein and by thereafter drying, evaporating or otherwise solidifying the carrier.

Figure 11A:
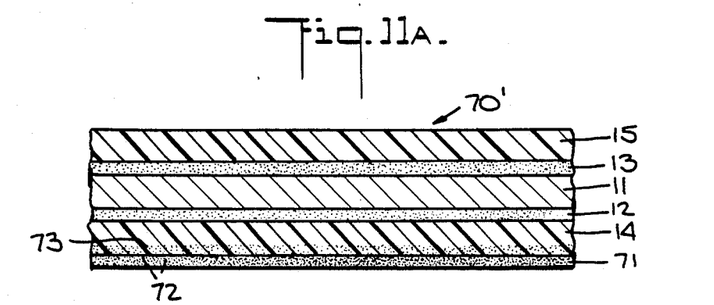

Another variant of this aspect of the invention is schematically illustrated in FIG. 11A. The laminate 70' there shown is essentially identical to that shown in FIG. 11 except that it has a mass of carbon particles 73 in a layer formation dispersed in the immediate subsurface region of the solid electrolyte layer 14 at a loading of somewhat less than 50%. Here the particles 73 do not constitute a part of the cathode, however, and except in random occurrences are not in electrical contact with each other. Rather, they are incorporated in the electrolyte layer only to reduce the internal impedance thereof. It will be understood that the layer formation of the particles 73 can be formed in various ways; for example, this can be done by dispersing the particles in a quantity of the uncured electrolyte polymer solution and then applying the latter in a second (or subsequent) pass to the particle-free cured portion of the layer 14 formed in the first (or prior) pass, following which the particle-containing polymer is cured, or by printing an ink or liquid carrier containing the particles onto the still uncured layer of polymer electrolyte so that the particles can migrate to the desired extent into the subsurface region of the layer before the same is cured. In either case, of course, the cathode-constituting layer 71 of particles 72 is applied to the solid electrolyte after the above-described incorporation therein of the particles 73 has been completed.

Figure 11B:
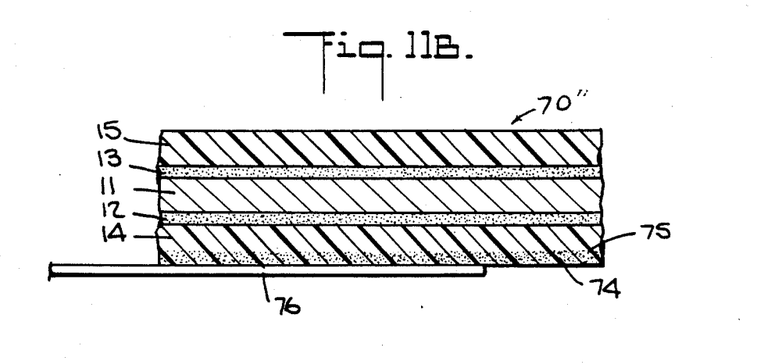

Yet another variant of this aspect of the invention is schematically illustrated in FIG. 11B. The laminate 70" there shown differs from those of FIGS. 11 and 11A only in that it has no cathode-forming layer of carbon particles external to the solid electrolyte layer 14. Rather, the cathode 74 is constituted of a mass of carbon particles 75 incorporated in a layer formation in the immediate subsurface region of the solid electrolyte layer 14 at a loading of at least, and preferably somewhat greater than, 50% so that the particles are in electrical contact with each other throughout the layer formation and simulate a solid conductor. The particles 75 in the cathode 74 must, of course, be capable of being connected to a suitable cathode lead 76, for example, by virtue of projecting slightly from the surface of the solid electrolyte layer 14 or otherwise. The manner of forming the cathode 74 is essentially the same as the manner in which the impedance-reducing layer formation of the particles 73 is formed and thus need not be described again at this point.

The manufacture of solid electrolyte capacitors embodying the principles of the present invention is further explained by the following examples.

EXAMPLE 1

An anode made from a 1 cm×1 cm piece of aluminum foil, 100$\mu$ thick and etched with holes 1-2$\mu$ in diameter, has an anode connection spot-welded at one edge. The surface of the foil is anodized, and the foil is then impregnated with a polymer electrolyte comprising potassium hexafluoroglutarate dissolved in a blend of 50% poly(ethylene oxide) $3 \times 10^5$ gmol$^{-1}$, 40% poly(methylmethoxy[poly(ethylene glycol) 350 daltons siloxane]) and 10% styrene, with the salt being present at a concentration of 0.04 moles of salt per mole of ethylene oxide repeat unit. After the polymer has been cured and the surface cross-linked, a coating of silver paint is applied to the resultant solid electrolyte film to form the cathode. Connection to the cathode is by a sliver of foil 0.5 cm×1 cm, rolled and welded to the cathode lead. The entire assembly is then exposed to a humid environment controlled by silica gel, and the aluminum oxide coating to constitute the dielectric is formed by applying 400 volts between the anode and cathode for 24 hours. The final assembly is oven dried at 60° C. for 24 hours under vacuum and then encapsulated in a coat of epoxy resin. The resulting capacitor construction is suited for use as a high voltage, printed circuit board-mounted capacitor and has a capacitance of about 0.87$\mu$ F, a voltage rating of about 380 volts, and an impulse current rating of 0.5 amp.

EXAMPLE 2

A capacitor is constructed as in Example 1 but the oven drying step is omitted, leaving a small quantity of moisture absorbed in the polymer electrolyte. Such a capacitor will have an enhanced oxide layer re-forming capability.

EXAMPLE 3

An anode is constructed from one piece of highly etched aluminum foil (10 cm×44 cm×75$\mu$). The etched pores in the foil are between 1 and 2$\mu$ in diameter and penetrate the thickness of the foil. The anode lead is connected to the foil by a series of rivets. The anode foil is impregnated with the same electrolyte salt/polymer blend as in Example 1. After the polymer has been cured and the surface of the resultant solid electrolyte film cross-linked, a coating of silver paint is applied to the film to form the cathode. Connection to the cathode is by a piece of unetched foil 0.5 cm×10 cm, rolled and welded to the cathode lead. The assembly is then exposed to a silica gel controlled humid environment and wound onto a 3 mm diameter cardboard tube. The assembly is then encapsulated in an aluminum tube with a rolled end seal, typical of the style found in photo flash capacitors. The dielectric is formed by applying 400 volts to the anode and cathode for 24 hours while the assembly is exposed to a controlled humidity at 25° C. Finally the end seal is closed. The resultant device has a discharge capacitance of about 400$\mu$ F, a rated voltage of about 390 volts, and an impulse current rating of 200 amps.

EXAMPLE 4

Ten sheets of aluminum foil (10 cm×10 cm×50$\mu$), with aluminum ribbon spot-welded at one edge, are prepared as anodes as in the preceding example. These sheets are saturated with the same polymer electrolyte as before but containing no styrene, with a double coat being provided at the edge of each sheet. After curing, but without cross-linking of the surface of the solid electrolyte films, the sheets are stacked and interspersed with cathodic conducting foils (10 cm×9 cm×10$\mu$), so that the edges of the anode and cathode foils are not adjacent. The dielectric oxide is formed as detailed in the previous examples, and the whole assembly is encapsulated in a box container. This type of assembly optimizes current capability by use of cathode foil rather than conductive paint (the former having a higher conductivity than the latter) and by omitting the crosslinking step which is not necessary for this construction because a multi-layer stacked film capacitor, being a flat layered structure, has adequate mechanical strength.

EXAMPLE 5

Flakes of etched formed aluminum anode material are mixed with the previously described polymer blend in a proportion of greater than 45% v/v. The mixture is spread as a thin film (10 cm×10 cm×100μ), a 10 cm aluminum wire lead is placed along the diagonal of the square, and the whole assembly is cured. The metal flake-impregnated polymer is then coated with a layer of electrolyte polymer about 10μ thick and the polymer cured. Sheets of this material are then interspersed with sheets of cathodic foil to produce a simply assembled capacitor. The whole assembly is subjected to the dielectric forming procedure described for the previous examples. The finished assembly forms a capacitor of about 200 F and rated at about 350 volts. This form of construction is suitable where ease of assembly is the prime objective.

EXAMPLE 6

A high surface area carbon anode 10 cm×5 cm×100μ in size is coated with a layer of the solid electrolyte of Example 1, the layer being 10–50μ thick. A gold foil cathode 10 cm×5 cm×10μ in size is then applied to the electrolyte layer. The resultant device constitutes a double layer capacitor having a capacitance of 50 mF and rated for ±5 volts.

Although the invention has been described with reference to particular embodiments and examples, it is to be understood that these embodiments and examples are merely illustrative of the principles of the invention. Numerous modifications may be made therein without departing from the spirit and scope of the invention.

We claim:

1. A compact electrolytic capacitor including an electrically conductive anode, an electrically conductive cathode, and an electrolyte between said anode and said cathode; characterized in that said electrolyte is in the form of an ultrathin layer of a solid solution of (a) at least one ionically conducting salt selected from the group consisting of alkali metal salts, transition metal salts and ammonium salts of (b) at least one acid selected from the group consisting of monobasic, dibasic and tribasic acids other than haloid acids (c) in an ionically conducting polymer of high solvation power.

2. An electrolytic capacitor according to claim 1, characterized in that said salt is the hexafluoroglutarate of sodium or potassium or lithium.

3. An electrolytic capacitor according to claim 1, characterized in that said salt is the tetrafluoroborate of sodium or potassium or lithium.

4. An electrolytic capacitor according to claim 1, characterized in that said salt is lithium thiocyanate.

5. An electrolytic capacitor according to claim 1, characterized in that said salt is lithium acetate.

6. An electrolytic capacitor according to claim 1, characterized in that the polymer component of said solid electrolyte comprises a siloxane-alkylene oxide copolymer.

7. An electrolytic capacitor according to claim 1, characterized in that the polymer component of said solid electrolyte comprises a blend of a siloxanealkylene oxide copolymer with poly(ethylene oxide).

8. An electrolytic capacitor according to claim 6 or 7, characterized in that said salt is the hexafluoroglutarate of sodium or potassium or lithium..

9. An electrolytic capacitor according to claim 6 or 7, characterized in that said salt is the tetrafluoroborate of sodium or potassium or lithium.

10. An electrolytic capacitor according to claim 1, 6 or 7, characterized in that said solid electrolyte further comprises a small amount of a hydroxyl group-containing substance.

11. An electrolytic capacitor according to claim 10, characterized in that said hydroxyl group-containing substance is water or an alcohol.

12. An electrolytic capacitor according to claim 11, characterized in that said salt is the hexafluoroglutarate of sodium or potassium or lithium.

13. An electrolytic capacitor according to claim 11, characterized in that said salt is the tetrafluoroborate of sodium or potassium or lithium.

14. An electrolytic capacitor according to claim 1, characterized in that said anode comprises a deeply etched foil of anodic metal, a dielectric oxide layer covers at least that surface of said foil which is directed toward said cathode, and said ultrathin layer is attached to said oxide layer-covered surface of said foil.

15. An electrolytic capacitor according to claim 14, characterized in that said solid electrolyte further comprises a small amount of a hydroxyl group-containing substance.

16. An electrolytic capacitor according to claim 15, characterized in that said hydroxyl group-containing substance is water or an alcohol.

17. An electrolytic capacitor according to claim 1, characterized in that said anode comprises a mass of particles of an electrically conductive substance, with at least some of said particles being embedded, in a layer formation and in electrical contact with each other, in a quantity of said solid electrolyte other than that constituting said ultrathin layer.

18. An electrolytic capacitor according to claim 17, characterized in that said electrically conductive substance is aluminum or other anodic metal.

19. An electrolytic capacitor according to claim 18, characterized in that said particles are in the form of pre-etched flakes, granules or microspheres.

20. An electrolytic capacitor according to claim 17, characterized in that said electrically conductive substance is carbon.

21. An electrolytic capacitor according to claim 20, characterized in that others of said particles are embedded in a quantity of an insulative polymer, said other particles being disposed in a layer formation and in electrical contact with each other and with those of said particles which are embedded in said quantity of said solid electrolyte, and said other particles being adapted for connection of an anode lead thereto.

22. An electrolytic capacitor according to claim 20, characterized in that said particles are sintered into the form of a layer-shaped body approximately 50% porous, a portion of said body which is proximate to said ultrathin layer is impregnated with a quantity of said solid electrolyte, and the remaining portion of said body is free of solid electrolyte, said remaining portion of said body being adapted for connection of an anode lead thereto 23. An electrolytic capacitor according to claim 20, characterized in that said particles are sintered into the form of a layer-shaped body approximately 50% porous, said body is impregnated with said quantity of said solid electrolyte, and a layer of solid, non-porous carbon adjoins said porous body at the face thereof directed away from said ultrathin layer, said layer of solid, non-porous carbon being adapted for connection of an anode lead thereto.

24. An electrolytic capacitor according to claim 1; characterized in that said cathode is constituted of a mass of electrically conductive particles in layer formation disposed in electrical contact with each other adjacent that surface of said layer of solid electrolyte which is directed away from said anode.

25. An electrolytic capacitor according to claim 24; characterized in that said layer formation of conductive particles constituting said cathode is disposed on said surface of said layer of solid electrolyte externally of the latter.

26. An electrolytic capacitor according to claim 25; characterized in that an additional mass of conductive particles in layer formation is disposed within said layer of solid electrolyte in the subsurface region of the latter immediately proximate to said surface thereof, the loading of said additional mass of conductive particles in said subsurface region of said solid electrolyte layer being less than 50% of the volume of that region.

27. An electrolytic capacitor according to claim 24; characterized in that said layer formation of conductive particles constituting said cathode is disposed within said layer of solid electrolyte in the subsurface region of the latter immediately proximate to said surface thereof, the loading of said mass of conductive particles in said subsurface region of said solid electrolyte layer being at least 50% of the volume of that region, and said mass of conductive particles is adapted for connection of a cathode lead thereto.

28. A compact electrolytic capacitor including an electrically conductive anode, an electrically conductive cathode, and an electrolyte between said anode and said cathode; characterized in that said electrolyte is in the form of a layer of a solid electrolyte, and said cathode is constituted solely of a mass of electrically conductive particles in a layer formation disposed in electrical contact with each other adjacent that surface of said layer of solid electrolyte which is directed away from said anode.

29. An electrolytic capacitor according to claim 28; characterized in that said layer formation of conductive particles constituting said cathode is disposed on said surface of said layer of solid electrolyte externally of the latter.

30. An electrolytic capacitor according to claim 29; characterized in that an additional mass of conductive particles in layer formation is disposed within said layer of solid electrolyte in the subsurface region of the latter immediately proximate to said surface thereof, the loading of said additional mass of conductive particles in said subsurface region of said solid electrolyte layer being less than 50% of the volume of that region.

31. An electrolytic capacitor according to claim 28; characterized in that said layer formation of conductive particles constituting said cathode is disposed within said layer of solid electrolyte in the subsurface region of the latter immediately proximate to said surface thereof, the loading of said mass of conductive particles in said subsurface region of said solid electrolyte layer being at least 50% of the volume of that region, and said mass of conductive particles is adapted for connection of a cathode lead thereto.

32. The method of making a compact electrolytic capacitor having an electrically conductive anode, an electrically conductive cathode, and an electrolyte between said anode and said cathode; characterized by:
providing said electrolyte in the form of a solution of
(a) at least one ionically conducting salt selected from the group consisting of alkali metal salts, transition metal salts and ammonium salts of (b) at least one acid selected from the group consisting of monobasic, dibasic and tribasic acids other than haloid acids (c) in an ionically conducting polymer of high solvation power;
forming an ultrathin layer of said electrolyte solution on said anode;
curing the polymer component of said electrolyte solution to form a layer of solid electrolyte on said anode; and
applying said cathode to said ultrathin layer at a location spaced from said anode.

33. The method of claim 32; characterized in that said salt is the hexafluoroglutarate of sodium or potassium or lithium.

34. The method of claim 32; characterized in that said salt is the tetrafluoroborate of sodium or potassium or lithium.

35. The method of claim 32; characterized in that said salt is lithium thiocyanate.

36. The method of claim 32; characterized in that said salt is lithium acetate.

37. The method of claim 32; characterized in that the polymer component of said electrolyte solution comprises a siloxane-alkylene oxide copolymer.

38. The method of claim 32; characterized in that the polymer component of said electrolyte solution comprises a blend of a siloxane-alkylene glycol copolymer with poly(ethylene oxide).

39. The method of claim 37 or 38; characterized in that said salt is the hexafluoroglutarate of sodium or potassium or lithium.

40. The method of claim 37 or 38; characterized in that said salt is the tetrafluoroborate of sodium, potassium or lithium.

41. The method of claim 32, 37 or 38; characterized by incorporating in said layer of solid electrolyte a small amount of a hydroxyl group-containing substance.

42. The method of claim 41; characterized in that said hydroxyl group-containing substance is water or an alcohol.

43. The method of claim 42; characterized in that said salt is the hexafluoroglutarate of sodium or potassium or lithium.

44. The method of claim 42; characterized in that said salt is the tetrafluoroborate of sodium, potassium or lithium.

45. The method of claim 32, wherein said anode comprises an anodic metal foil which is deeply etched to have a multiplicity of pores therein and is covered over at least its entire surface area directed toward said cathode, including the interior surfaces of said pores, with a dielectric oxide layer; characterized by:
applying to said anodic metal foil a quantity of said electrolyte solution sufficient to enable a portion of said electrolyte solution to penetrate into said pores and to enable the portion of said electrolyte solution remaining on said anodic metal foil exterior to said pores to form said ultrathin layer; and
said layer of solid electrolyte after curing of the polymer component of said electrolyte solution having an enhanced mechanical interlock to said anodic metal foil.

46. The method of claim 45; characterized by:
incorporating in said ultrathin layer of said electrolyte solution a small amount of a hydroxyl group-containing substance; and
applying across said anode and cathode a potential sufficient to release hydroxyl ions from said hydroxyl group-containing substance and cause said ions to react with said anodic metal to form said dielectric oxide layer on said anodic metal foil.

47. The method of claim 46; characterized in that said hydroxyl group-containing substance is water or an alcohol.

48. The method of claim 32; characterized by:
providing in a layer formation and in electrical contact with each other a mass of particles of an electrically conductive substance;
impregnating at least a part of said mass of particles, which is sufficient in quantity to constitute at least a part of said anode, in a first quantity of said electrolyte solution; and
providing over said impregnated part of said mass of particles a second quantity of said electrolyte solution which is free of said particles and is sufficient to constitute said ultrathin layer and, after curing the polymer component of said electrolyte solution, constitutes said layer of solid electrolyte.

49. The method of claim 48; characterized in that said particles of an electrically conductive substance are etched particles of aluminum or other anodic metal and have a dielectric oxide coating thereon.

50. The method of claim 49; characterized in that said particles are in the form of flakes, granules or microspheres.

51. The method of claim 50; characterized by:
applying to the entire mass of particles in said layer formation a total quantity of said electrolyte solution a part of which is said first quantity serving to impregnate said mass of particles and the remainder of which is said second quantity serving to form said ultrathin particle-free layer.

52. The method of claim 50; characterized by:
applying to the entire mass of particles in said layer formation a total quantity of said electrolyte solution which is said first quantity serving to impregnate said mass of particles; and
applying to said impregnated mass of particles an additional quantity of said electrolyte solution which is said second quantity serving to form said ultrathin particle-free layer.

53. The method of claim 52; characterized by:
applying said additional quantity of said electrolyte solution to said impregnated mass of particles in a plurality of passes in the first of which the polymer component of said electrolyte solution has a lowest molecular weight and in each subsequent pass of which the polymer component has a progressively higher molecular weight than in the last preceding pass.

54. The method of claim 48; characterized in that said particles of an electrically conductive substance are particles of carbon.

55. The method of claim 54; characterized by:
applying to a first part of said mass of particles in said layer formation a total quantity of said electrolyte solution a part of which is said first quantity serving to impregnate said first part of said mass of particles and the remainder of which is said second quantity serving to form said ultrathin particle-free layer;
applying to a second part of said mass of particles in a layer formation and in electrical contact with each other a quantity of an insulative polymer to impregnate said second part of said mass of particles; and
disposing said impregnated first part of said mass of particles and said impregnated second part of said mass of particles in laminated relation to each other at the side of the former opposite the side where the same adjoins said ultrathin particle-free layer, with said second part of said mass of particles in electrical contact with said first part of said mass of particles;
said second part of said mass of particles providing a contact location for an anode connector lead without permitting the latter to be in direct contact with said solid electrolyte.

56. The method of claim 54; characterized by:
applying to a first part of said mass of particles in said layer formation a total quantity of said electrolyte solution which is said first quantity serving to impregnate said first part of said mass of particles;
applying to said impregnated first part of said mass of particles an additional quantity of said electrolyte solution which is said second quantity serving to form said ultrathin particle-free layer;
applying to a second part of said mass of particles in a layer formation and in electrical contact with each other a quantity of an insulative polymer to impregnate said second part of said mass of particles; and
disposing said impregnated first part of said mass of particles and said impregnated second part of said mass of particles in laminated relation to each other at the side of the former opposite the side where the same adjoins said ultrathin particle-free layer, with said second part of said mass of particles in electrical contact with said first part of said mass of particles;
said second part of said mass of particles providing a contact location for an anode connector lead without permitting the latter to be in direct contact with said solid electrolyte.

57. The method of claim 56; characterized by:
applying said additional quantity of said electrolyte solution to said impregnated first mass of particles in a plurality of passes in the first of which the polymer component of said electrolyte solution has a lowest molecular weight and in each subsequent pass of which the polymer component has a progressively higher molecular weight than in the last preceding pass.

58. The method of claim 54; characterized by:
sintering all of said mass of particles to form a porous layer-shaped body thereof having about 50% of its volume constituted by said particles; and
applying to a major portion of said body, exclusive of a limited layer-like portion contiguous to one face of said body, a total quantity of said electrolyte solution a part of which is said first quantity serving to impregnate said major portion of said body and the remainder of which is said second quantity serving to form said ultrathin particle-free layer;
said limited portion of said body providing a contact location for an anode connector lead without permitting the latter to be in direct contact with said solid electrolyte.

59. The method of claim 54; characterized by:

sintering all of said mass of particles to form a porous layer-shaped body thereof having about 50% of its volume constituted by said particles;

applying to a major portion of said body, exclusive of a limited layer-like portion contiguous to one face of said body, a total quantity of said electrolyte solution which is said first quantity serving to impregnate said major portion of said body; and applying to said major portion of said body at the face thereof opposite said one face an additional quantity of said electrolyte solution which is said second quantity serving to form said ultrathin particle-free layer;

said limited portion of said body providing a contact location for an anode connector lead without permitting the latter to be in direct contact with said solid electrolyte.

60. The method of claim 59; characterized by:

applying said additional quantity of said electrolyte solution to said major portion of said body in a plurality of passes in the first of which the polymer component of said electrolyte solution has a lowest molecular weight and in each subsequent pass of which the polymer component has a progressively higher molecular weight than in the last preceding pass.

61. The method of claim 54; characterized by:

sintering all of said mass of particles to form a porous layer-shaped body thereof having about 50% of its volume constituted by said particles;

applying to all of said body a total quantity of said electrolyte solution a part of which is said first quantity serving to impregnate said body and the remainder of which is said second quantity serving to form said ultrathin particle-free layer:

providing a nonporous layer-shaped body of carbon; and disposing said impregnated body and said nonporous body of carbon in laminated relation to each other at the side of the former opposite the side where the same adjoins said ultrathin particle-free layer, with said bodies in electrical contact with each other;

said nonporous body of carbon providing a contact location for an anode connector lead without permitting the latter to be in direct contact with said solid electrolyte.

62. The method of claim 54; characterized by:

sintering all of said mass of particles to form a porous layer-shaped body thereof having about 50% of its volume constituted by said particles;

applying to all of said body a total quantity of said electrolyte solution which is said first quantity serving to impregnate said body;

applying to said impregnated body at one face thereof an additional quantity of said electrolyte solution which is said second quantity serving to form said ultrathin particle-free layer;

providing a nonporous layer-shaped body of carbon; and disposing said nonporous body of carbon and said impregnated body in laminated relation to each other at the side of the latter opposite the side where the same adjoins said ultrathin particle-free layer, with said bodies in electrical contact with each other;

said nonporous body of carbon providing a contact location for an anode connector lead without permitting the latter to be in direct contact with said solid electrolyte.

63. The method of claim 62; characterized by:

applying said additional quantity of said electrolyte solution to said impregnated body in a plurality of passes in the first of which the polymer component of said electrolyte solution has a lowest molecular weight and in each subsequent pass of which the polymer component has a progressively higher molecular weight than in the last preceding pass.

64. The method of claim 32; characterized by:

providing adjacent that surface of said layer of solid electrolyte which is directed away from said anode a primary mass of electrically conductive particles in a layer formation disposed in electrical contact with each other to constitute said cathode.

65. The method of claim 64; characterized by:

applying to said surface of said layer of solid electrolyte externally of the latter a layer of a liquid carrier having said primary mass of conductive particles dispersed therein; and drying, evaporating or curing said liquid carrier.

66. The method of claim 64; characterized by:

applying to that surface of said ultrathin layer of electrolyte solution which is directed away from said anode a layer of a liquid carrier having said primary mass of conductive particles dispersed therein;

prior to the curing of said polymer component of said electrolyte solution, permitting some of said conductive particles to migrate into the immediate subsurface region of said ultrathin layer to a degree of loading of less than 50% of the volume of that region; and concomitantly with the curing of said polymer component of said electrolyte solution, drying, evaporating or curing said liquid carrier;

those of said conductive particles thereby embedded in said subsurface region of said layer of solid electrolyte serving to reduce the internal impedance of the latter, and those of said conductive particles remaining on said layer of solid electrolyte constituting said cathode.

67. The method of claim 64; characterized by:

applying to said surface of said layer of solid electrolyte an additional layer of electrolyte solution having a secondary mass of conductive particles dispersed therein to a degree of loading of less than 50% of the volume of said additional layer;

curing the polymer component of the electrolyte solution in said additional layer to cause the latter to become a part of said layer of solid electrolyte, with said secondary mass of conductive particles embedded therein;

applying to that surface of said part of said layer of solid electrolyte which is directed away from said anode a layer of a liquid carrier having said primary mass of conductive particles dispersed therein to a degree of loading of more than 50% of the volume of that layer; and drying, evaporating or curing said liquid carrier;

those of said conductive particles thereby embedded in said part of said layer of solid electrolyte serving to reduce the internal impedance of the latter, and those of said conductive particles disposed on said layer of solid electrolyte constituting said cathode.

68. The method of claim 64; characterized by:
applying to said surface of said layer of solid electrolyte an additional layer of electrolyte solution having said primary mass of conductive particles dispersed therein to a degree of loading of more than 50% of the volume of said additional layer; and
curing the polymer component of the electrolyte solution in said additional layer to cause the latter to become a part of said layer of solid electrolyte, with said primary mass of conductive particles embedded therein and constituting said cathode.

69. The method of making a compact electrolytic capacitor including an electrically conductive anode, an electrically conductive cathode, and a electrolyte between said anode and said cathode; characterized by:
providing said electrolyte in the form of a layer of solid electrolyte on said anode;
providing adjacent that surface of said layer of solid electrolyte which is directed away from said anode a primary mass of electrically conductive particles in a layer formation disposed in electrical contact with each other to constitute said cathode; and
applying to said surface of said layer of solid electrolyte externally of the latter a layer of a liquid carrier having said primary mass of conductive particles dispersed therein; and
drying, evaporating or curing said liquid carrier.

70. The method of claim 69; characterized by:
providing in said layer of solid electrolyte, in the immediate subsurface region thereof adjacent to said surface, a secondary mass of conductive particles to a degree of loading of less than 50% of the volume of that region;
those of said conductive particles embedded in said subsurface region of said layer of solid electrolyte serving to reduce the internal impedance of the latter but not constituting a part of said cathode.

71. The method of claim 70; characterized by:
providing said secondary mass of conductive particles in said subsurface region of said layer of solid electrolyte prior to the application of said primary mass of conductive particles in said liquid carrier to said surface of said layer of solid electrolyte.

72. The method of claim 70; characterized by:
providing said secondary mass of conductive particles in said subsurface region of said layer of solid electrolyte subsequent to the application of said primary mass of conductive particles in said liquid carrier to said surface of said layer of solid electrolyte.

73. The method of claim 69; characterized by:
providing said primary mass of conductive particles in the immediate subsurface region of said layer of solid electrolyte adjacent said surface thereof to a degree of loading of more than 50% of the volume of said region.

* * * * *